(12) United States Patent
Forster et al.

(10) Patent No.: US 12,735,061 B2
(45) Date of Patent: Sep. 15, 2026

(54) DRIVER ASSISTANCE SYSTEM AND DRIVER ASSISTANCE METHOD FOR A VEHICLE

(71) Applicant: Bayerische Motoren Werke Aktiengesellschaft, Munich (DE)

(72) Inventors: Yannick Forster, Munich (DE); Frederik Naujoks, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 109 days.

(21) Appl. No.: 18/843,334

(22) PCT Filed: Apr. 21, 2023

(86) PCT No.: PCT/EP2023/060422
§ 371 (c)(1),
(2) Date: Sep. 3, 2024

(87) PCT Pub. No.: WO2023/203193
PCT Pub. Date: Oct. 26, 2023

(65) Prior Publication Data
US 2025/0171043 A1 May 29, 2025

(30) Foreign Application Priority Data
Apr. 22, 2022 (DE) ..................... 10 2022 109 811.7

(51) Int. Cl.
*B60W 50/14* (2020.01)
*B60K 35/235* (2024.01)

(52) U.S. Cl.
CPC ........... *B60W 50/14* (2013.01); *B60K 35/235* (2024.01); *B60W 2540/225* (2020.02)

(58) Field of Classification Search
CPC ... B60W 2540/225; B60W 2554/4048; B60W 2540/229; B60W 2040/0818;
(Continued)

(56) References Cited

U.S. PATENT DOCUMENTS 10,752,253 B1 8/2020 Nath et al.
2014/0236383 A1 8/2014 Nagatomi et al.
(Continued)

FOREIGN PATENT DOCUMENTS

DE 10 2007 025 531 A1 12/2008
DE 10 2008 038 816 A1 2/2010
(Continued)

OTHER PUBLICATIONS

International Search Report (PCT/ISA/210) issued in PCT Application No. PCT/EP2023/060422 dated Jul. 14, 2023 with English translation (6 pages).
(Continued)

*Primary Examiner* — Khoi H Tran
*Assistant Examiner* — Tanner L Cullen
(74) *Attorney, Agent, or Firm* — Crowell & Moring LLP

(57) ABSTRACT

The present disclosure relates to a driver assistance system for a vehicle, in particular a motor vehicle. Forms of a driver assistance system comprises at least one driver detection module, which is designed to detect a driver and to provide detection data; and at least one processor module. The at least one processor module is designed to: identify a plurality of individual glances of the driver away from a reference gaze direction, based on the detection data; determine a corresponding glance time duration for each individual glance of the plurality of individual glances; identify a change in the glance time duration over time and in relation to a threshold value; and control at least one vehicle function based on the identified change in the glance time duration.

10 Claims, 2 Drawing Sheets

(58) Field of Classification Search
CPC ........... B60W 50/14; B60W 2050/143; B60W 2050/146; B60K 35/235; B60K 35/285; G06V 20/597; H04N 13/383; G06F 3/013
See application file for complete search history.

(56) References Cited

U.S. PATENT DOCUMENTS

| | | | | |
|---|---|---|---|---|
| 2016/0110621 | A1 | 4/2016 | Tsimhoni et al. | |
| 2018/0072327 | A1* | 3/2018 | Seppelt .................. | B60K 35/10 |
| 2018/0319408 | A1 | 11/2018 | Hoetzer | |
| 2019/0283764 | A1 | 9/2019 | Morimoto et al. | |
| 2021/0347365 | A1 | 11/2021 | Yamaguchi et al. | |
| 2021/0354703 | A1* | 11/2021 | Fairgrieve ........... | B60W 30/182 |
| 2022/0058408 | A1 | 2/2022 | Skrypchuk et al. | |
| 2022/0324457 | A1* | 10/2022 | Arora .................... | B60W 40/08 |
| 2023/0106487 | A1* | 4/2023 | Alexander ............ | B60W 50/16 340/576 |
| 2023/0174073 | A1* | 6/2023 | Komine ............... | A61B 5/4094 |
| 2023/0306758 | A1* | 9/2023 | Miyamoto ........... | G06V 20/597 |

FOREIGN PATENT DOCUMENTS

| | | | | |
|---|---|---|---|---|
| DE | 10 2011 084 367 | A1 | 4/2013 | |
| DE | 10 2011 084 887 | A1 | 4/2013 | |
| DE | 10 2014 202 673 | A1 | 8/2014 | |
| DE | 10 2015 117 224 | A1 | 4/2016 | |
| DE | 10 2015 224 555 | A1 | 6/2017 | |
| DE | 10 2019 215 308 | A1 | 4/2021 | |
| DE | 11 2019 004 676 | T5 | 6/2021 | |
| DE | 11 2020 001 197 | T5 | 12/2021 | |
| EP | 2284057 | A2 * | 2/2011 | .......... B60W 50/087 |

OTHER PUBLICATIONS

German-language Written Opinion (PCT/ISA/237) issued in PCT Application No. PCT/EP2023/060422 dated Jul. 14, 2023 with English translation (8 pages).

German-language Search Report issued in German Application No. 10 2022 109 811.7 dated Nov. 11, 2022 with partial English translation (11 pages).

* cited by examiner

DRIVER ASSISTANCE SYSTEM AND DRIVER ASSISTANCE METHOD FOR A VEHICLE

BACKGROUND AND SUMMARY

The present disclosure relates to a driver assistance system for a vehicle, a vehicle having such a driver assistance system, a driver assistance method for a vehicle and a storage medium for carrying out the driver assistance method. The present disclosure relates in particular to avoidance of negative adjustment of the behavior of a driver to suit a mode of operation of a driver monitoring system.

Modern vehicles are increasingly being fitted with driver monitoring systems (DMS) that monitor a driver by means of an interior camera and for example output a warning if the driver does not look at the road for a relatively long time. Such driver monitoring systems are intended to increase road safety.

Over time, however, the behavior of the driver can be adjusted to suit the driver monitoring system, for example as a result of the driver, over time, adjusting their viewing behavior to suit the driver monitoring system's threshold value for output of a warning. By way of example, the driver can become accustomed to a warning after three seconds and increasingly use up the period prior to the warning. The result is that over time the driver looks away from the road for longer, which can lead to dangerous road situations.

It is an object of the present disclosure to specify a driver assistance system for a vehicle, a vehicle having such a driver assistance system, a driver assistance method for a vehicle and a storage medium for carrying out the driver assistance method that are able to prevent negative adjustment of the behavior of a driver to suit a mode of operation of driver monitoring. In particular, it is an object of the present disclosure to improve road safety by avoiding critical situations due to driver behavior.

This object is achieved by the subject matter of the independent claims. Advantageous configurations are specified in the dependent claims.

According to one independent aspect of the present disclosure, a driver assistance system for a vehicle, in particular a motor vehicle, is specified. The driver assistance system comprises at least one driver detection module configured to detect a driver and to provide detection data; and at least one processor module. The at least one processor module is configured to: take the detection data as a basis for recognizing a multiplicity of individual glances by the driver away from a reference line of vision; to determine an applicable glance duration for each individual glance of the multiplicity of individual glances; to recognize a change in the glance duration over time and with regard to a threshold value; and to trigger at least one vehicle function on the basis of the recognized change in the glance duration.

The at least one driver detection module and the at least one processor module may be implemented in a common software and/or hardware module. Alternatively, the at least one driver detection module and the at least one processor module may each be implemented in separate software and/or hardware modules.

According to some forms of the invention, the driver's glance duration e.g. away from the road is monitored. If a change in the glance duration is recognized, for example because the glance duration matches a threshold value for output of driver guidelines, or warnings, suitable countermeasures can be taken. For example, the threshold value for output of driver guidelines can be varied, with the result that the driver can no longer rely on the driver guidelines being output after a particular time. This makes it possible to ensure that there is no negative adjustment of the behavior of the driver to suit the mode of operation of the driver assistance system. The result is that road safety can be improved.

The at least one driver detection module preferably comprises at least one sensor configured to detect the driver and to provide the detection data. The at least one sensor may be an optical sensor, for example a camera, in particular an interior camera. The at least one driver detection module can optionally comprise at least one light source. In some embodiments, the light source may be an infrared light source, and the at least one sensor may be an infrared sensor, for example an infrared camera.

The at least one processor module is configured to evaluate the detection data, for example image data, provided by the at least one driver detection module. The evaluation of the detection data allows in particular the line of vision of the driver to be detected, or determined.

The at least one processor module determines whether the line of vision of the driver differs from a reference line of vision. The reference line of vision is preferably a line of vision onto a road ahead of the vehicle. If the line of vision of the driver differs from the reference line of vision, that is to say if the driver looks away from the road, this event can be recognized as an individual glance having a particular glance duration. The glance duration can indicate for how long the driver does not look in the reference line of vision, or for how long the driver looks away from the reference line of vision.

The at least one processor module determines whether there is a change in the glance duration over time and with regard to a threshold value. In particular, the processor module can determine whether the glance duration approaches the threshold value over time, that is to say over a sequence of individual glances away from the reference line of vision. If such a change in the glance duration is recognized, the processor module triggers at least one vehicle function in order to counteract the recognized change, which indicates a negative adjustment of the behavior of the driver to suit the mode of operation of the driver assistance system.

The change in the glance duration can be recognized and/or the triggering of the at least one vehicle function can be carried out if the change satisfies at least one predefined criterion. The at least one predefined criterion may be selected from the group comprising, or consisting of, a direction of the change in the glance duration with regard to the threshold value (e.g. a direction of the glance duration toward the threshold value, i.e. an approach toward the threshold value), a rate of the change in the glance duration (e.g. a rapidity of the change in the glance duration) and a distance from the threshold value (e.g. an estimated time before the threshold value is approximately reached and/or a relative distance (e.g. in % of the threshold value; e.g. 10% or less or 20% or less) and/or an absolute distance (e.g. in seconds) from the threshold value).

The at least one vehicle function preferably relates to, or is, output of a driver guideline to the driver. In some embodiments, the driver assistance system may be configured to monitor the driver and output a driver guideline on the basis of the monitoring. By way of example, the driver assistance system can react to a risky behavior by the driver and notify the driver thereof, so that dangerous road situations can be proactively prevented from arising.

The driver guideline is preferably a warning notice, in particular with regard to a driver behavior detected by the driver assistance system, for example looking away from the road for increasingly longer.

The change in the glance duration over time is determined with regard to a threshold value. By way of example, the threshold value may be three seconds, it being possible to determine whether the glance duration approaches this threshold value over time. If the glance duration approaches this threshold value over time, triggering the at least one vehicle function allows negative adjustment of the behavior of the driver to suit the mode of operation of the driver assistance system to be effectively counteracted.

The threshold value preferably indicates a period of time between a glance by the driver away from the reference line of vision (e.g. the road) and the triggering of the at least one vehicle function, in particular output of the driver guideline. In particular, the driver assistance system may be configured to output the driver guideline to the driver if a line of vision of the driver while in motion differs from the reference line of vision for a predefined time or for longer (i.e. a time corresponding to the threshold value). In particular, the driver assistance system can compare the reference line of vision with the line of vision of the driver and output the driver guideline if the driver does not look in the reference line of vision for longer than the time corresponding to the threshold value.

The threshold value is preferably two seconds or longer, three seconds or longer, or four seconds or longer. In some embodiments, the threshold value may be three seconds.

The at least one processor module is preferably further configured to change the threshold value from a first value to a second value, which is different than the first value, when the change in the glance duration is recognized, in particular when the at least one criterion with regard to the change is met. By way of example, the at least one processor module may be configured to change the threshold value from the first value to the second value if the glance duration changes in the direction of the threshold value. To put it another way, the threshold value e.g. for output of the driver guideline can be varied in order to counteract an adjustment of the behavior of the driver to suit the initially fixed threshold value for the warnings.

The second value is preferably greater than the first value (e.g. three seconds). Alternatively, the second value may be less than the first value (e.g. three seconds).

The at least one processor module is preferably configured to select the second value from a predetermined value range at random. The predetermined value range may be a range between two and four seconds, for example. Additionally or alternatively, the predetermined value range may be provided by a normal distribution of the individual glances away from the road as a function of the glance duration, for example between two and four seconds.

Additionally or alternatively, the at least one processor module may be configured to select the second value on the basis of historical glance durations pertaining to the driver. By way of example, the driver assistance system may be configured to determine a distribution of the individual glances away from the road as a function of the glance duration, the second value being able to be selected e.g. at random from this driver-specific historical distribution.

In some embodiments, the driver-specific historical distribution can be determined by the driver at the start of use of the vehicle and/or the driver assistance system. By way of example, the driver-specific historical distribution can be ascertained prior to activation and/or use of the driver monitoring and/or output of the driver guidelines ("learning phase").

The at least one processor module is preferably further configured to change the threshold value from the second value back to the first value if a retrograde change in the glance duration is recognized. In particular, it is possible to check whether the accumulation of the glance durations around the original threshold value is retrogressive over a defined period. If this is the case, the original threshold value (e.g. three seconds) can be adopted again. The driver assistance system can then again monitor a shift in the glance durations toward the threshold value.

According to another independent aspect of the present disclosure, a vehicle, in particular a motor vehicle, is specified. The vehicle comprises the driver assistance system according to the embodiments of the present disclosure.

The term vehicle covers cars, trucks, buses, motor caravans, motorcycles, etc. that are used to convey people, goods, etc. In particular, the term covers motor vehicles for conveying people.

According to another independent aspect of the present disclosure, a driver assistance method for a vehicle, in particular a motor vehicle, is specified. The driver assistance method comprises recognizing a multiplicity of individual glances by a driver away from a reference line of vision; determining a glance duration for each individual glance of the multiplicity of individual glances; recognizing a change in the glance duration over time and with regard to a threshold value; and triggering at least one vehicle function on the basis of the recognized change in the glance duration.

The driver assistance method can implement the aspects of the driver assistance system described in this document.

According to another independent aspect of the present disclosure, a software (SW) program is specified. The SW program can be configured to be executed on one or more processors and to thereby carry out the driver assistance method described in this document.

According to another independent aspect of the present disclosure, a storage medium is specified. The storage medium can comprise a SW program that is configured to be executed on one or more processors and to thereby carry out the driver assistance method described in this document.

According to another independent aspect of the present disclosure, a software comprising program code for carrying out the driver assistance method can be executed when the software runs on one or more software-controlled devices.

According to another independent aspect of the present disclosure, a system for driver monitoring is specified. The system comprises one or more processors; and at least one memory that is connected to the one or more processors and contains instructions that can be executed by the one or more processors in order to carry out the driver assistance method described in this document.

A processor, or a processor module, is a programmable arithmetic unit, that is to say a machine or an electronic circuit that, based on transferred commands, controls other elements and drives an algorithm (process).

BRIEF DESCRIPTION OF THE DRAWINGS

Exemplary embodiments of the disclosure are depicted in the figures and are described in more detail below. In the figures.

DETAILED DESCRIPTION OF THE DRAWINGS

Unless stated otherwise, the same reference signs are used hereinbelow for elements that are the same and have the same effect.

Figure 1:
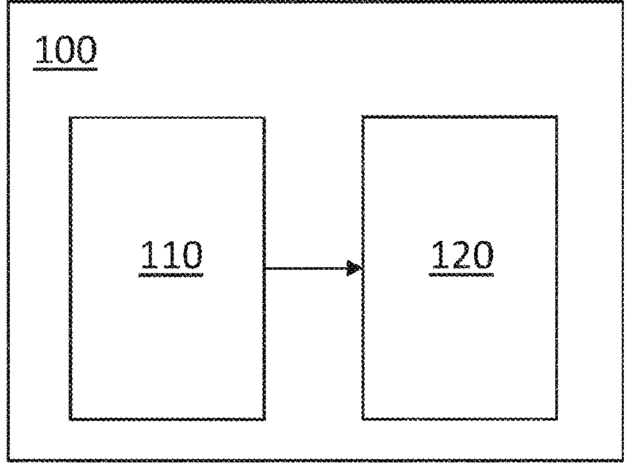
FIG. 1 schematically shows a driver assistance system according to embodiments of the present disclosure, FIG. 2 schematically shows a vehicle having a driver assistance system according to embodiments of the present disclosure.
Figure 2:
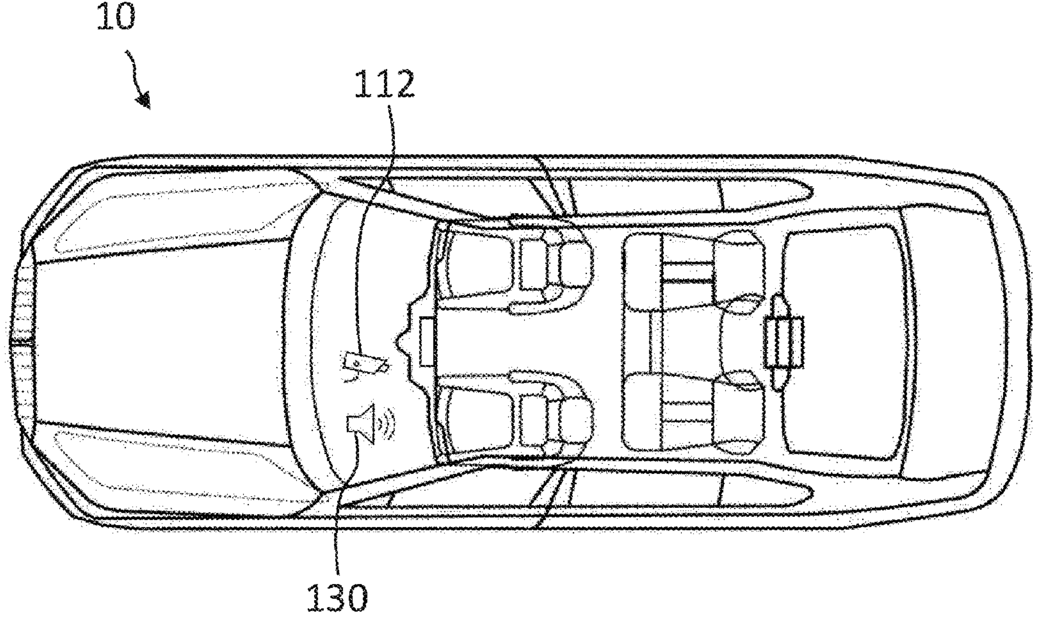

FIG. 1 schematically shows a driver assistance system 100 for a vehicle according to embodiments of the present disclosure. FIG. 2 schematically shows a vehicle 10 having a driver assistance system 100 according to embodiments of the present disclosure.

The driver assistance system 100 comprises at least one driver detection module 110 and at least one processor module 120. The at least one driver detection module 110 and the at least one processor module 120 may be implemented in a common software and/or hardware module. Alternatively, the at least one driver detection module 110 and the at least one processor module 120 may each be implemented in separate software and/or hardware modules.

The at least one driver detection module 110 is configured to detect a driver. In particular, the driver assistance system 100 may be configured to monitor the driver and to output a driver guideline on the basis of the monitoring. The driver guideline can be output audibly by way of a loudspeaker 130 of a user interface module of the driver assistance system, for example. The driver guideline is preferably a warning notice, in particular with regard to a driver behavior detected by the at least one driver detection module 110, such as averting one's eyes from the road ahead of the vehicle for a relatively long time.

In some embodiments, the at least one driver detection module 110 can comprise at least one sensor 112 configured to detect the driver, e.g. optically. The at least one sensor 112 may be an optical sensor, for example a camera, in particular an interior camera. The at least one driver detection module 110 can optionally comprise at least one light source. In illustrative embodiments, the light source may be an infrared light source, and the at least one sensor 112 may be an infrared sensor, for example an infrared camera.

The at least one processor module 120 is configured to evaluate the detection data, for example image data, provided by the at least one driver detection module 110. In particular, the at least one processor module 120 is configured to take the detection data as a basis for recognizing a multiplicity of individual glances by the driver away from a reference line of vision; to determine an applicable glance duration for each individual glance of the multiplicity of individual glances; to recognize a change in the glance duration over time and with regard to a threshold value; and to trigger at least one vehicle function on the basis of the recognized change in the glance duration.

By way of example, the at least one processor module 120 takes the detection data as a basis for determining whether the line of vision of the driver differs from a reference line of vision. The reference line of vision is preferably a line of vision onto a road ahead of the vehicle. If the line of vision of the driver differs from the reference line of vision, that is to say if the driver looks away from the road, this event can be recognized as an individual glance having a particular glance duration. The glance duration can indicate for how long the driver does not look in the reference line of vision, or for how long the driver looks away from the reference line of vision.

The at least one processor module 120 further determines whether there is a change in the glance duration over time and with regard to a threshold value. In particular, the at least one processor module 120 can determine whether the glance duration approaches the threshold value over time, that is to say over a sequence of individual glances away from the reference line of vision. If such a change in the glance duration is recognized, the at least one processor module 120 triggers at least one vehicle function (e.g. output of the driver guideline) in order to counteract the recognized change, which indicates a negative adjustment of the behavior of the driver to suit the mode of operation of the driver assistance system 100.

The change in the glance duration can be recognized and/or the triggering of the at least one vehicle function can be carried out if the change in the glance duration satisfies at least one predefined criterion. The at least one predefined criterion can comprise for example a direction of the change in the glance duration with regard to the threshold value (e.g. a direction of the glance duration toward the threshold value, i.e. an approach toward the threshold value), a rate of the change in the glance duration (e.g. a rapidity of the change in the glance duration), a distance from the threshold value (e.g. a relative distance from the threshold value), etc.

In some embodiments, the at least one processor module 120 can change the threshold value for output of the driver guideline from a first value (e.g. a fixed threshold value of three seconds) to a second value (e.g. two seconds or four seconds) when the change in the glance duration is recognized. In particular, the threshold value for output of the driver guideline can be varied in order to counteract an adjustment of the behavior of the driver to suit the threshold value for warning output.

In some embodiments, the second value can be selected from a predetermined value range at random. The predetermined value range may be for example a normally distributed range between two and four seconds. Additionally or alternatively, the second value can be selected on the basis of historical glance durations pertaining to the driver, in particular a driver-specific historical individual glance distribution.

In some embodiments, the at least one processor module 120 is further configured to change the threshold value for output of the driver guideline from the second value back to the (fixed) first value if a retrograde change in the glance duration is recognized. In particular, it is possible to check whether an accumulation of the glance durations around the original threshold value is retrogressive over a defined period. If this is the case, the original fixed threshold value (e.g. three seconds) can be adopted again. The driver assistance system 100 can then again monitor a shift in the glance durations toward the threshold value.

Figure 3:
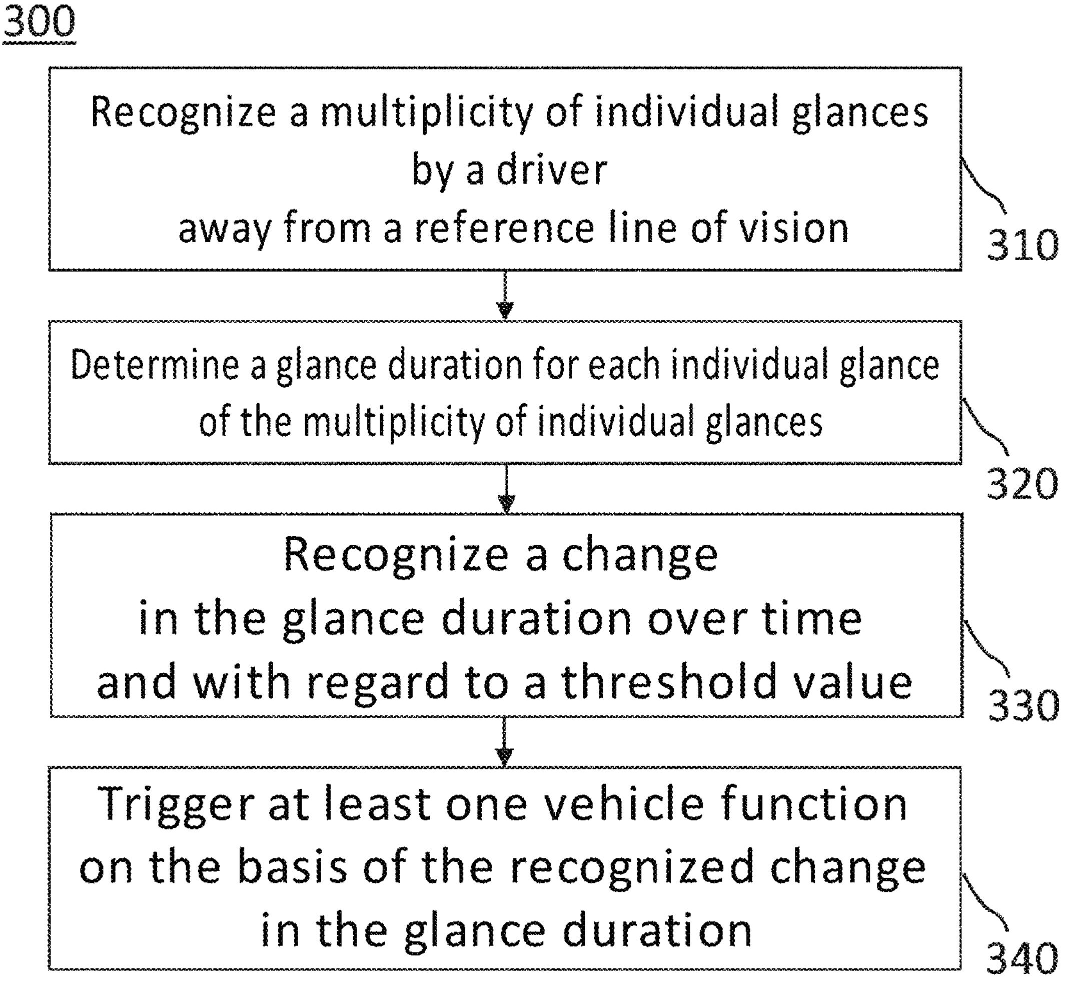
FIG. 3 shows a flowchart for a driver assistance method according to embodiments of the present disclosure.

FIG. 3 schematically shows a flowchart for a driver assistance method 300 according to embodiments of the present disclosure. The driver assistance method 300 can be implemented by an appropriate software that is executable by one or more processors (e.g. a CPU).

The driver assistance method 300 comprises recognizing a multiplicity of individual glances by a driver away from a reference line of vision in block 310; determining a glance duration for each individual glance of the multiplicity of individual glances in block 320; recognizing a change in the glance duration over time and with regard to a threshold value in block 330; and triggering at least one vehicle function, e.g. output of a driver guideline, on the basis of the recognized change in the glance duration in block 340.

According to the invention, the driver's glance duration e.g. away from the road is monitored. If a change in the glance duration is recognized, for example because the glance duration matches a threshold value for output of driver guidelines, or warnings, suitable countermeasures can be taken. For example, the threshold value for output of driver guidelines can be varied, with the result that the driver can no longer rely on the driver guidelines being output after a particular time. This makes it possible to ensure that there is no negative adjustment of the behavior of the driver to suit the mode of operation of the driver assistance system. The result is that road safety can be improved.

Although the invention has been illustrated and explained more thoroughly in detail by preferred exemplary embodiments, the invention is not restricted by the examples disclosed, and other variations can be derived therefrom by a person skilled in the art without departing from the scope of protection of the invention. It is therefore clear that there are a large number of variation possibilities. It is also clear that embodiments mentioned by way of illustration are actually only examples, which should in no way be regarded as a limitation of, for instance, the scope of protection, the application options or the configuration of the invention. Rather, the above description and the description of the figures enable a person skilled in the art to implement the illustrative embodiments in a concrete way, wherein the person skilled in the art, with knowledge of the concept of the invention disclosed, can make diverse changes for example in respect of the function or the arrangement of individual elements mentioned in an exemplary embodiment, without departing from the scope of protection defined by the claims and the legal counterparts thereof, such as, for instance, more extensive explanations in the description.

The invention claimed is:

1. A driver assistance system for a vehicle, comprising:

at least one sensor configured to:

detect a driver and to provide detection data;

at least one processor configured to:

receive the detection data as a basis for recognizing a multiplicity of individual glances by the driver away from a reference line of vision;

determine an applicable glance duration for each individual glance of the multiplicity of individual glances;

recognize a change in the glance duration over time and with regard to a threshold value; and trigger at least one vehicle function on the basis of the recognized change in the glance duration;

wherein the at least one processor is further configured to:

change the threshold value from a first value to a second value, which is different than the first value, when the change in the glance duration is recognized; and change the threshold value from the second value back to the first value when a retrograde change in the glance duration is recognized.

2. The driver assistance system according to claim 1, wherein the at least one vehicle function relates to an output of a driver guideline to the driver.

3. The driver assistance system according to claim 1, wherein the threshold value indicates a period of time between a glance by the driver away from the reference line of vision and the triggering of the at least one vehicle function.

4. The driver assistance system of claim 3, wherein the reference line of vision is an output of a driver guideline.

5. The driver assistance system according to claim 1, wherein the at least one processor is configured to change the threshold value from the first value to the second value when the glance duration changes to be closer to the threshold value.

6. The driver assistance system according to claim 1, wherein the at least one processor is configured to at least one of:

select the second value from a predetermined value range at random; or select the second value on the basis of historical glance durations pertaining to the driver.

7. A vehicle comprising the driver assistance system according to claim 1.

8. The vehicle of claim 7, where the vehicle is a motor vehicle.

9. A driver assistance method for a vehicle, comprising:

recognizing, with a processor of a driver assistance system, a multiplicity of individual glances by a driver away from a reference line of vision;

determining, with the processor, a glance duration for each individual glance of the multiplicity of individual glances;

recognizing, with the processor, a change in the glance duration over time and with regard to a threshold value; and triggering, with the processor, at least one vehicle function on the basis of the recognized change in the glance duration;

wherein the method further comprises changing, with the processor, the threshold value from a first value to a second value, which is different than the first value, when the change in the glance duration is recognized; and changing, with the processor, the threshold value from the second value back to the first value when a retrograde change in the glance duration is recognized.

10. A non-transitory computer-readable storage medium, comprising a set of instructions configured to be executed on one or more processors and cause the one or more processors to perform acts of:

recognizing a multiplicity of individual glances by a driver away from a reference line of vision;

determining a glance duration for each individual glance of the multiplicity of individual glances;

recognizing a change in the glance duration over time and with regard to a threshold value; and triggering at least one vehicle function on the basis of the recognized change in the glance duration;

wherein the set of instructions further cause the one or more processors to perform acts of:

changing the threshold value from a first value to a second value, which is different than the first value, when the change in the glance duration is recognized; and changing the threshold value from the second value back to the first value when a retrograde change in the glance duration is recognized.

* * * * *